(12) United States Patent
Liu et al.

(10) Patent No.: US 11,514,242 B2
(45) Date of Patent: Nov. 29, 2022

(54) METHOD FOR AUTOMATICALLY SUMMARIZING INTERNET WEB PAGE AND TEXT INFORMATION

(71) Applicant: Chongqing Sizai Information Technology Co., Ltd., Chongqing (CN)

(72) Inventors: Sha Liu, Chongqing (CN); Dongqin Yao, Chongqing (CN)

(73) Assignee: Chongqing Sizai Information Technology Co., Ltd., Chongqing (CN)

( * ) Notice: Subject to any disclaimer, the term of this patent is extended or adjusted under 35 U.S.C. 154(b) by 0 days.

(21) Appl. No.: 16/984,095

(22) Filed: Aug. 3, 2020

(65) Prior Publication Data
US 2021/0042467 A1 Feb. 11, 2021

(51) Int. Cl.
*G06F 40/284* (2020.01)
*G06F 40/205* (2020.01)
*G06F 16/953* (2019.01)

(52) U.S. Cl.
CPC ......... *G06F 40/205* (2020.01); *G06F 16/953* (2019.01); *G06F 40/284* (2020.01)

(58) Field of Classification Search
CPC ......... G06F 16/30; G06F 16/20; G06F 40/00; G06N 20/00; G06N 3/00; G06N 5/00; G06N 7/00
See application file for complete search history.

(56) References Cited

U.S. PATENT DOCUMENTS

| | | | |
|---|---|---|---|
| 2003/0101415 A1* | 5/2003 | Chang | G06F 40/137 715/231 |
| 2004/0117740 A1* | 6/2004 | Chen | 715/210 |
| 2004/0225667 A1* | 11/2004 | Hu | G06F 16/345 |
| 2008/0109399 A1* | 5/2008 | Liao | G06F 16/345 |
| 2010/0287162 A1* | 11/2010 | Shirwadkar | G06F 16/3338 707/740 |
| 2017/0046434 A1* | 2/2017 | Liu | G06F 16/00 |
| 2018/0144188 A1* | 5/2018 | Evanitsky | G06F 40/242 |
| 2020/0349222 A1* | 11/2020 | Kadambi | G06F 40/205 |

FOREIGN PATENT DOCUMENTS

| | | |
|---|---|---|
| CN | 101620596 A | 1/2010 |
| CN | 101667194 A | 3/2010 |
| CN | 104657347 A | 5/2015 |

* cited by examiner

*Primary Examiner* — Sanchita Roy (57) ABSTRACT

Based on a double-ten law of an Internet information organization structure, the present invention provides a method for automatically summarizing web page and text information, where matching information elements by category is added to an existing method, and content keywords and related contexts of summary (or abstract) information are directly extracted by using various successfully matched information element organization structure words. On this basis, the present invention further provides a method for supplementing summary information elements based on title information, and a method for superposing title information element organization structure words. Therefore, a new method for automatically summarizing web page and text information is comprehensively and systematically provided, and automatic summarization quality of the web page and text information can be greatly improved.

5 Claims, 7 Drawing Sheets

Schematic structural diagram of a double-ten law of an Internet information organization structure Enter any subject keyword: National Development and Reform Commission, Apple, smartphones, cloud computing, Putin, World Cup, European and American blockbusters ...

| 10 general categories of related information | News/ Message | Notice | Knowledge | Product | Service | Forum | Interpersonal communication | On-demand /Download | Weibo /WeChat | Big yellow page | New category added by a user | Others |
|---|---|---|---|---|---|---|---|---|---|---|---|---|
| Top-level organization structure words in each category (not a confirmed version, but indicative only) | Title | Title | Title | Title | Title | Title | Title | Title | Title | Title | Title | Unstructured summary |
| | Subject of behavior | Subject of notice | Question | Product name | Service content | Topic of forum | Purpose of communication | Content overview | User name | User type | ( ) | |
| | Behavior | Object of notice | Concept definition | Product description | Service mode | Forum popularity | Gender | Leading actor | User introduction | User introduction | ( ) | |
| | Time | Region of notice | Content introduction | Manufacturer | Service time | Quantity of active users | Age | Data size | Content category | Organization setup | ( ) | |
| | Place | Key point of notice | Principle description | Product price | User rating | Network administrator | Occupation | Information source | Information source | Contact information | ... | |
| | Current situation | Publishing time | Application method | Seller | Service provider | Initiator | Educational level | Usage fee | Creation date | Certification authority | ... | |
| | Overview | Validity of notice | Information source | Information source | Information source | Related domain name | Career | Provider | Application platform | Website | ... | |
| | Comment | ... | ... | ... | ... | ... | ... | ... | ... | ... | ... | |
| | Others (free summary) | Others (......) | Others (......) | Others (......) | Others (......) | Others (......) | Others (......) | Others (......) | Others (......) | Others (......) | Others (......) | |

Note: This template is an open template. A user can freely enter related information in the parts in red, and the system can adjust categories and organization structure words in the template according to a result of automatic statistics.

FIG. 1

| News information element word | |
|---|---|
| Subject of behavior | All nouns |
| Behavior | All verbs |
| Result | Cause, form, generate ... |
| Time | Results in all time information expressions: year, month, date, hour, minute, second |
| Place | All address information names: Globe, state, country, province, city, county ... |
| Current situation | At present, currently, now ... |
| Background | Background, cause, reason ... |
| Overview | Since, situation |
| Comment | Think ... |
| Others | |

FIG. 2

News information:
Subject keywords: Spurs, Hornets, NBA, and game
Title: A result of the game at San Antonio today is that the Spurs beat the Hornets
Summary of the full text:
(Subjects) Spurs and Hornets
(Behavior) NBA regular-season game
(Time) May 18, 2019
(Place) ATT Center of San Antonio
(Result) 90:87, the Spurs beat the Hornets
Details: On May 18, the Spurs vs. Hornets game at San Antonio home is fierce, and captains of both parties have a good performance ....

METHOD FOR AUTOMATICALLY SUMMARIZING INTERNET WEB PAGE AND TEXT INFORMATION

CROSS-REFERENCE TO RELATED APPLICATIONS

This application claims the benefit of priority from a Chinese Patent Application No. 201910737556.1, filed on Aug. 10, 2019. The content of the aforementioned application, including any intervening amendments thereto, is incorporated herein by reference in its entirety.

TECHNICAL FIELD

The present invention relates to the field of computers and communications, and in particular, to a method for automatically summarizing web page information and text information.

BACKGROUND

Application efficiency of mass information first depends on efficiency of information summarization. Quality of automatic summarization of Internet information is closely related to organization and application efficiency of the Internet information. Therefore, for more than half a century, numerous scholars and related workers have been devoted, from generation to generation, to research of a method for automatically summarizing text and web page information. For example, full-text keyword search for web page information, which is an only general mode for organizing web page information and has been popular for more than 20 years, is to automatically extract a summary of web page information according to a full-text keyword search result. Apparently, an automatic summarization technology has significant application value in the Internet field. However, it is a pity that with respect to full-text keyword search for web page information, there is no great breakthrough in summary quality for summaries that can be seen so far. Therefore, people still have to go to related web pages of search result links again and again for browsing, to distinguish whether there is information that they need.

According to our research, a key cause for low quality of automatic summarization is that information elements forming a summary of web page and text information are not merely subject keywords. For example, a quality summary of news information includes information elements such as time, place, subject, behavior, and result. A quality summary of product information includes information elements such as product name, manufacturer, product description, production date, and sales price. If information elements in an original text are incomplete, it is impossible to generate a high-quality summary.

Another important issue is that in most cases, even if there is summary element information in an original text, an organization structure word of a summary element does not appear. For example, a piece of news information "A result of the NBA game at San Antonio home on May 18 is 90:87, the Spurs beat the Hornets" includes five elements of time, place, subject, behavior, and result in news information elements, but organization structure words "time, place, subject, behavior, and result" of the information elements do not appear in an original text. Which keywords belong to the element information cannot be determined, and this directly makes it difficult to extract the element information during automatic summarization. Therefore, a core problem of summary information quality to be solved is how to extract summary information elements in the original text.

To extract the summary information elements in the original text, we have performed a systematic analysis on element composition of full-text keyword search results of web page information, and discovered an important law of an Internet information organization structure: a double-ten law.

Refer to FIG. 1 for the double-ten law of an Internet information organization structure.

Enter any keyword (for example, National Development and Reform Commission, Apple, smartphones, cloud computing, Putin, World Cup, or Wolf Warriors) in a full-text keyword input box, and top-level high-frequency categories of related information thereof include the following 10 categories: news/message, notice, knowledge, product, service, interpersonal communication, forum, on-demand/download, Weibo/WeChat, and big yellow page (two information categories are combined into one category because their content organization structures are similar, but function differences are obvious).

In addition, there are also approximately 10 top-level high-frequency organization structure words in each category. For example, top-level high-frequency organization structure words of recruitment, job application, marriage-seeking, and dating all include: purpose of communication, age, gender, educational background, occupation, personality, hobbies . . . . Therefore, they all belong to the "interpersonal communication" information category.

A historical process of development of science and technology tells us that newly discovered scientific principles and objective laws are primary productive forces that promote technological innovation. The "double-ten law" tells us that seemingly immense, unorganized, and undisciplined Internet information actually has simple and general content elements and organization structures. Therefore, based on the double-ten law, we can provide a method for automatically summarizing web page and text information, thereby fundamentally improving quality and efficiency of automatic summarization of web page information.

SUMMARY

To fundamentally improve quality and efficiency of automatic summarization of web page and text information, the present invention provides a method for automatically summarizing web page and text information. A main process of the method is as follows:

Main Process:

obtaining a preset web page information and text information element top-level high-frequency organization structure word list, and web page or text source information for which information element top-level high-frequency organization structure word tags have been obtained and which is available for summary extraction;

determining whether an information category of the source information categorized based on information element top-level high-frequency organization structure words has been obtained; and if the information category has been obtained, proceeding to a next step; or if the information category has not been obtained, automatically categorizing the source information;

determining whether subject keywords of the web page or text information of the present invention have been indicated in the source information; and if an indication has been obtained, proceeding to a next step; or if no definite indication has been obtained, obtaining subject keywords of the source information by using a related method;

extracting content keywords and contexts of summary information by using the obtained source information category, successfully matched information element organization structure words in the category, and the subject keywords;

determining summary information quality by using a summary quality indicator, and scoring the summary information quality according to a quality determining result;

according to the determining result in the previous step, determining whether to return to the main process; and if yes, returning to a step of the main process, and using an adjusted information summarization method to perform summary information extraction on the source information again and perform summary quality scoring again; or if no, proceeding to a next step; and storing summary information obtained after performing all the foregoing steps, in an automatic summarization result storage database;

where the web page information and text information are existing known common sense semantics;

a difference between the web page information and the text information lies in that the web page information generally includes some application attribute tags of the web page information, but the text information generally lacks application attribute tags;

the preset information element top-level high-frequency organization structure word list is a categorization set of top-level high-frequency organization structure words that indicate functions and an effective range of content keywords of the web page and text information and cannot be further summarized;

the content keywords are keywords in the source information that represent file content;

the source information for which top-level high-frequency organization structure word tags have been obtained is a set of all content keywords of the web page or text information for which information element top-level high-frequency organization structure word tags have been obtained;

the source information available for summary extraction is original information that has undergone processing such as automatic word segmentation, filtering of prepositions and function words, and part-of-speech tagging, where the part-of-speech is a general application attribute such as a noun, a verb, an adjective, or a preposition; and the subject keywords are keywords that represent a content subject of the web page or text information.

Subprocess 1:

The method for supplementing title information elements in the main process includes the following steps:

obtaining the source information, information category, and title information from a result of performing the main process;

matching all information element organization structure word tags of the title information in the source information by using all information element organization structure words in an information element lexicon, and determining, according to a matching result, whether an information element structure of a title is complete; and if the information element structure of the title is complete, ending the step of this subprocess; or if the information element structure of the title is incomplete, proceeding to a next step;

matching a same organization structure word tag in the source information by using a missing information element organization structure word in a result obtained by performing the foregoing step; and if an information element organization structure word is successfully matched, using an information element word under a successfully matched organization structure word tag in the source information to fill in the title information; where the method in this subprocess is also applicable to supplementation of information elements of a sentence in a text of the source information.

Subprocess 2:

The method for superposing title information element organization structure words in the main process includes the following steps:

determining a structure type of a title of the source information;

matching information element organization structure words in a same category in an information element lexicon by using information element organization structure words in different structures of the same title of the source information; and superposing different information element organization structure words that are separately obtained, and performing summarization and combination by using related information element words in the source information according to a superposition result;

where the information element organization structure word superposition is to combine matching results of different parts of information element organization structure words in the same information category and the same title; and the method for superposing information element organization structure words in this subprocess is also applicable to information element processing in units of sentences in a text of the source information.

Subprocess 3:

The method for obtaining information element top-level high-frequency organization structure word tags for content keywords of the source information in the main process includes the following steps:

storing all content keywords having information element attributes in various types of web page or text information, in a preset information element lexicon by category;

performing all-element traversal matching in different categories for all content keywords of the source information by using all information element words in the information element lexicon; and for any content keyword of the source information that successfully matches an information element word in the information element lexicon, adding an information element organization structure word tag in each information category;

where the content keywords having information element attributes have application attributes for being used as information element words in the information category of the present invention;

the information element lexicon is a database for storing all information element words by category; and the all-element traversal matching means for any piece of source information, using all information element words in the information element lexicon of the present invention to match all content keywords of the source information by category and word by word.

Subprocess 4:

The information categorization method in the main process may include the following steps:

performing all-element traversal matching for all information organization structure word tags in the content keywords of the source information by using all information element organization structure words in all categories in the information element organization structure word list, and calculating a quantity of successful matches of information element organization structure words in each category and a repetition rate thereof; and determining the information category of the information according to a scoring result of each information category.

Subprocess 5:

The method for obtaining subject keywords of the information includes the following steps:

extracting noun content keywords from a title of the source information;

if there is only one noun content keyword in the title, proceeding to a next subprocess; or if there is more than one noun content keyword in the title, using each noun content keyword obtained from the title to match a same content keyword in a full text of the source information in a same information category, and counting a quantity of successful matches of each successfully matched content keyword;

determining a position of each successfully matched noun content keyword in the source information, and calculating scores of position weights of the subject keywords; and according to a score of each content keyword that is obtained in the previous step, extracting a noun having a highest score and closest to a verb as a preferred subject keyword of the source information, and sorting all subject keywords of the information according to quantities of successful matches of other subject keywords and weight scores thereof in the full text;

where the position weight is a distance weight between a noun content keyword and a verb.

Subprocess 6:

The method for extracting content keywords and contexts from the information in the main process includes the following steps:

calculating a quantity of subject keywords obtained from each sentence of the source information in the previous subprocess and comprehensive scores of distance weights between the subject keywords and verbs; and extracting sentences of the source information in descending order of scores as summary contexts according to a comprehensive scoring result obtained by performing the previous step.

Subprocess 7:

The method for determining summary information quality by using a summary quality indicator, and scoring the summary information quality according to a quality determining result includes the following steps:

extracting the content keywords and contexts of the summary information;

determining, by category according to a preset summary quality indicator, the summary information quality obtained after performing the foregoing subprocess;

sorting quality of all related summary information according to a summary information quality determining result obtained in the foregoing step;

according to a sorting result obtained in the previous step, proceeding to a next step, or returning to a step of an adjusted summary extraction method in the main process; and storing an information summary extraction result and quality sorting information that are obtained by performing all the foregoing steps, in an automatic summarization storage database;

where the summary quality indicator includes availability, integrity, and reliability;

the availability indicates whether a summary information structure in the present invention lacks a core element;

the integrity indicates whether there is an information element word under each information element structure word of the summary information;

the reliability indicates a direct correlation between an information publisher and published information; and the adjusted summary extraction method includes adjusting an information element lexicon and a weight indicator of an information element organization structure word, and the information element lexicon adjustment is to increase or decrease information element words or information element word categories in the information element lexicon.

It should be specially noted that various methods in the automatic summarization method provided by the present invention may be subject to change of an application sequence by a user and freely combined. All independent claims of each related method in the present invention are objects requested to be protected in the present invention patent.

In view of a fundamental improvement of automatic summarization quality of general web page and text information, which has irreplaceable core value for an Internet information organization structure and information applications, the implementation and application of the present invention will not only have a great impact on various fields of Internet information applications, but also powerfully promote further development of Internet applications.

BRIEF DESCRIPTION OF DRAWINGS

FIG. 1 is a schematic diagram of a double-ten law of an Internet information organization structure;

DESCRIPTION OF EMBODIMENTS

The following further describes the present invention with reference to embodiments.

Note: Because there are many embodiments of the present invention, the embodiments are numbered.

Embodiment 1

Figure 2:
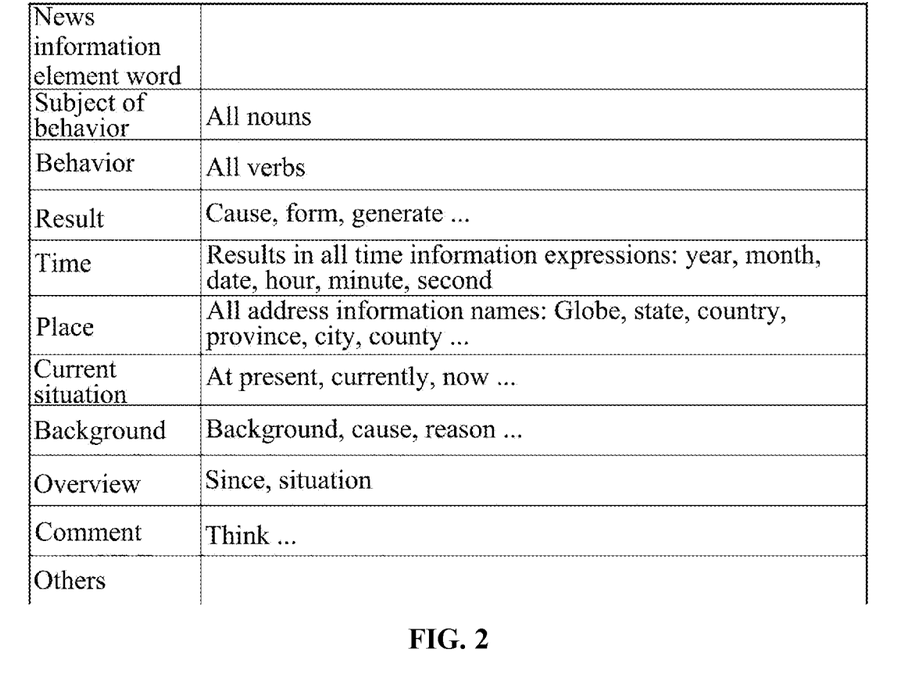
FIG. 2 is an example of content of an information element lexicon.
Figure 3:
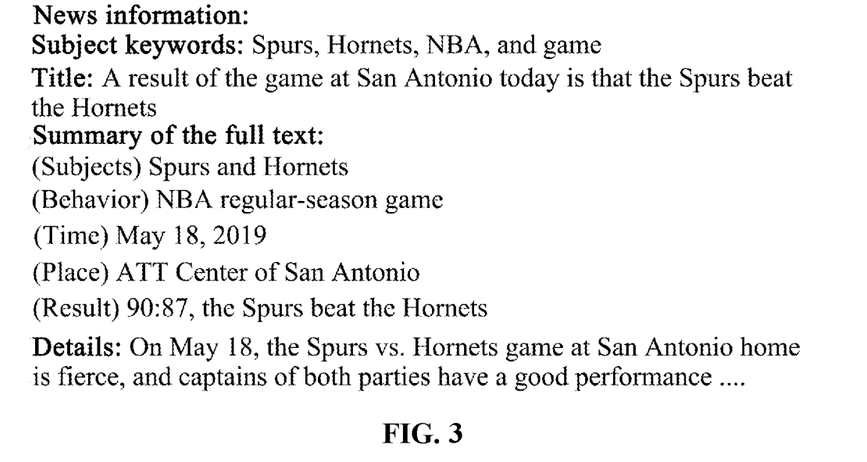
FIG. 3 is an example of a displayed summary extraction result.
Figure 4:
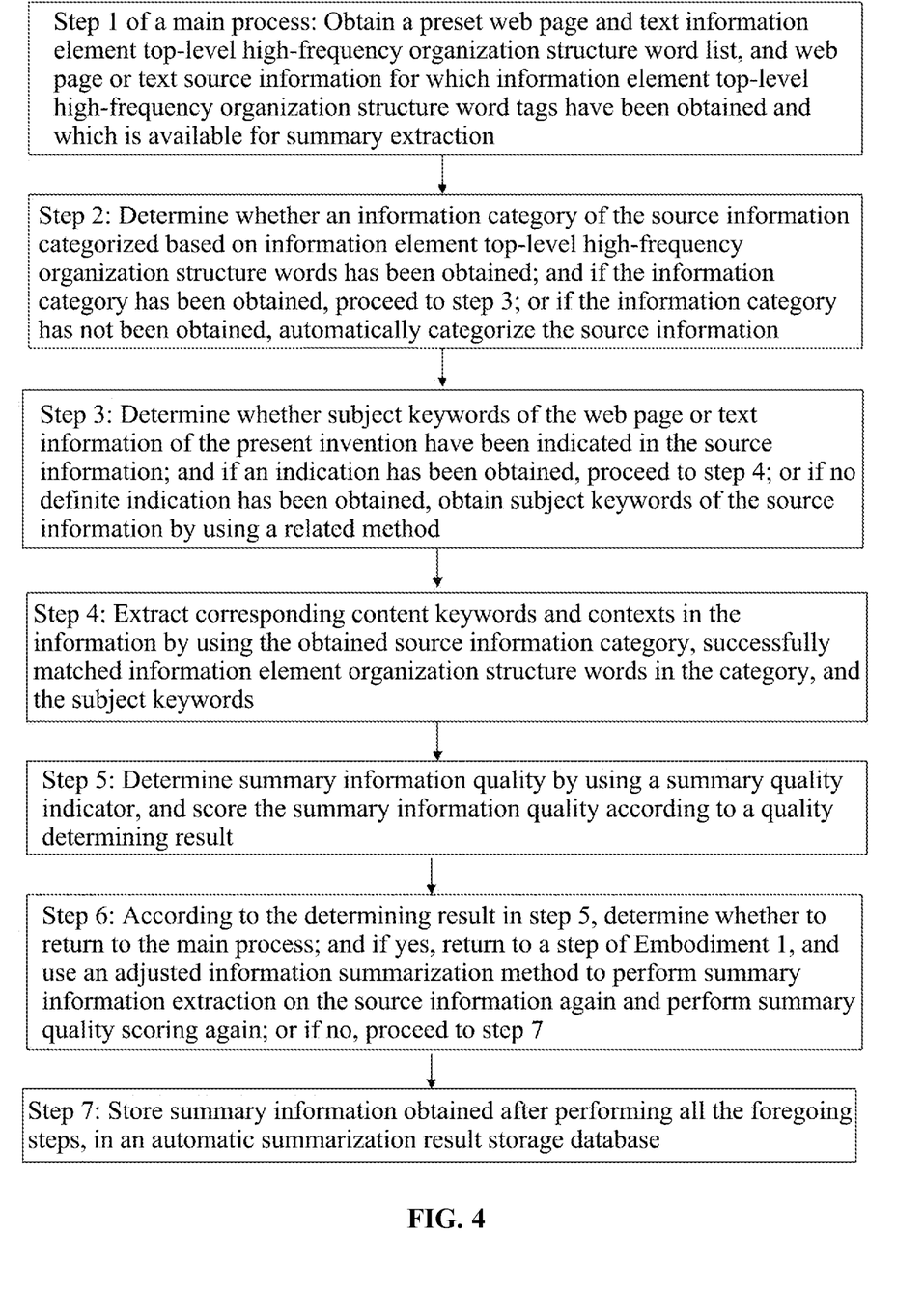
FIG. 4 is a main process: a method for automatically summarizing web page and text information.

Refer to FIG. 1, FIG. 2, and FIG. 4.

To fundamentally improve quality and efficiency of automatic summarization of web page and text information, the present invention provides a method for automatically summarizing web page and text information. A main process of the method is as follows:

Step 1 of Embodiment 1: Obtain a preset web page and text information element top-level high-frequency organization structure word list, and web page or text source information for which information element top-level high-frequency organization structure word tags have been obtained and which is available for summary extraction.

The web page information and text information are existing known common sense semantics. A difference between the web page information and the text information lies in that the web page information generally includes some application attribute tags (for example, a title tag, a paragraph tag, a subject word tag, and a link address) of the web page information, but the text information generally lacks application attribute tags.

The preset information element top-level high-frequency organization structure word list is a categorization set of top-level high-frequency organization structure words that indicate functions and an effective range of content keywords of the web page and text information and cannot be further summarized.

For example, as shown in FIG. 1, time, place, subject, behavior, and result in news information elements are a categorization set of top-level high-frequency organization structure words that cannot be further summarized in news information.

The source information for which top-level high-frequency organization structure word tags have been obtained is all content keywords of the web page or text information for which information element top-level high-frequency organization structure word tags have been obtained.

For example, when an original text is "A result of the NBA game at San Antonio home on May 18 is 90:87, the Spurs beat the Hornets", a manner of recording source information in a news information category may be: May 18 (time), San Antonio home (place), NBA (subject), game (behavior), 90:87 (result), Spurs (subject), Hornets (subject) . . . , where all the words that appear in the source information (such as May 18, San Antonio home, NBA, game, result, 90:87, Spurs, and Hornets) are content keywords, and the words in brackets such as time, place, subject, behavior, and result are top-level high-frequency organization structure word tags of news information elements indicating content keywords of the source information. Certainly, the top-level high-frequency organization structure word tags may also be any symbols corresponding to the words "time, place, subject, behavior, and result" on a one-to-one basis.

The content keywords are keywords in the source information that represent file content.

The source information available for summary extraction is original information that has undergone processing such as automatic word segmentation, filtering of prepositions and function words, and part-of-speech tagging, where the part-of-speech is a general word attribute such as a noun, a verb, an adjective, or a preposition.

Step 2 of Embodiment 1: Determine whether an information category of the source information categorized based on information element top-level high-frequency organization structure words has been obtained; and if the information category has been obtained, proceed to step 3; or if the information category has not been obtained, automatically categorize the source information.

Step 3 of Embodiment 1: Determine whether subject keywords of the web page or text information of the present invention have been indicated in the source information; and if an indication has been obtained, proceed to step 4; or if no definite indication has been obtained, obtain subject keywords of the source information by using a related method.

The subject keywords are a set of keywords that represent a content subject of the web page or text information.

Step 4 of Embodiment 1: Extract content keywords and contexts of summary information by using the obtained source information category, successfully matched information element organization structure words in the category, and the subject keywords.

The method for extracting content keywords and contexts of summary information includes a method for supplementing title summary information elements and a method for superposing title information element organization structure words.

Step 5 of Embodiment 1: Determine summary information quality by using a summary quality indicator, and score the summary information quality according to a quality determining result.

Step 6 of Embodiment 1: According to the determining result in step 5, determine whether to return to the main process; and if yes, return to a step of Embodiment 1, and use an adjusted information summarization method to perform summary information extraction on the source information again and perform summary quality scoring again; or if no, proceed to step 7.

The adjusted information summarization method includes adjusting a weight parameter of an information element and an information element lexicon.

Step 7 of Embodiment 1: Store summary information obtained after performing all the foregoing steps, in an automatic summarization result storage database.

The automatic summarization result storage database is a relational database established according to the information category of the present invention and an information organization structure in the category.

Embodiment 2

Figure 5:
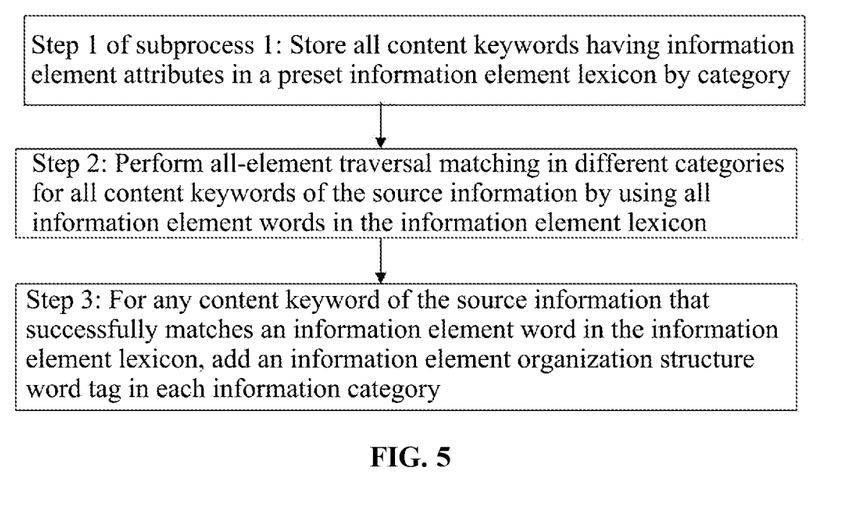
FIG. 5 is subprocess 1: a method for obtaining information element organization structure word tags for content keywords of source information.

Refer to FIG. 2 and FIG. 5.

A plurality of methods are available for obtaining information element top-level high-frequency organization structure word tags for content keywords of the source information in step 1 of Embodiment 1.

For example, when information element organization structure word tagging is performed for the source information, information element organization structure word tagging may be performed only for stable finite information element words (for example, information element organization structure word tagging is performed only for information element words in a time category, a place category, and a behavior category, but for a large quantity of constantly generated nouns (such as Spurs and Hornets), an elimination method is used to obtain information element organization structure word tags).

The method for obtaining information element organization structure word tags for content keywords of the source information may include the following steps:

Step 1 of Embodiment 2: Store all content keywords having information element attributes in a preset information element lexicon by category.

The information element attributes are application attributes for being used as information element words in the information category of the present invention.

The information element lexicon is a database for storing all information element words by category.

For example, in the information element lexicon, "May 18" may be an information element word under a same information element organization structure word "time" in a news category, a notice category, a product category, a service category . . . simultaneously; "San Antonio" may be an information element word under a same information element organization structure word "place" in the news category, the notice category, the product category . . . simultaneously; and "game" may be an information element word under different information element organization structure words in different information categories simultaneously (for example, news category—behavior, and knowledge category—concept definition).

Step 2 of Embodiment 2: Perform all-element traversal matching in different categories for all content keywords of the source information by using all information element words in the information element lexicon.

The all-element traversal matching means for any piece of source information, using all information element words in the information element lexicon of the present invention to match all content keywords of the source information by category and word by word.

Step 3 of Embodiment 2: For any content keyword of the source information that successfully matches an information element word in the information element lexicon, add an information element organization structure word tag in each information category.

For example, information element organization structure word tagging results of the content keywords of the source information in the foregoing example may be:

May 18 (news—time, notice—time, product—delivery time . . . ), San Antonio (news—place, notice—place, product—place . . . ), and game (news category—behavior, knowledge category—concept definition . . . ).

Embodiment 3

Figure 6:
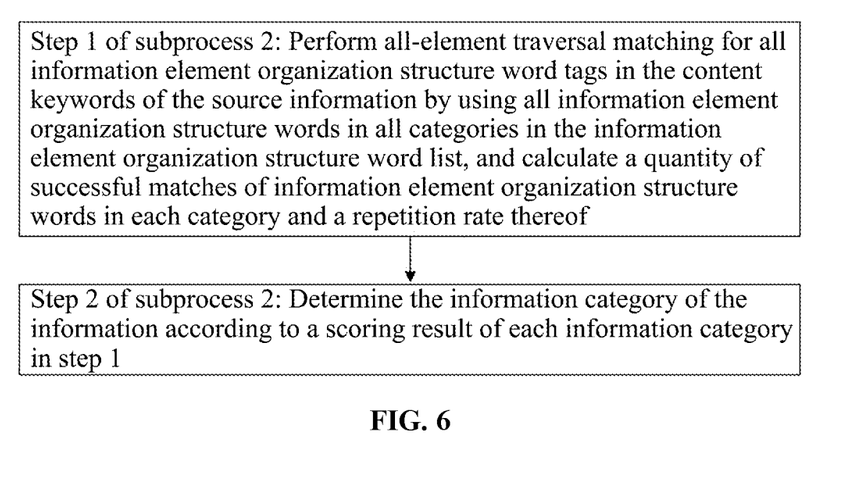
FIG. 6 is subprocess 2: an information categorization method for web page and text source information.

Refer to FIG. 6.

The information categorization method in step 3 of Embodiment 1 may include the following steps:

Step 1 of Embodiment 3: Perform all-element traversal matching for all information element organization structure word tags in the content keywords of the source information by using all information element organization structure words in all categories in the information element organization structure word list, and calculate a quantity of successful matches of information element organization structure words in each category and a repetition rate thereof.

Using the original text "A result of the NBA game at San Antonio home on May 18 is 90:87, the Spurs beat the Hornets" as an example, a result of matching tags of all content keywords of the source information by using all information element organization structure words in the news, service, knowledge . . . categories in the information element organization structure word list may be as follows:

News category: Six organization structure keywords are successfully matched, and are "May 18 (time), San Antonio home (place), NBA game (behavior), result 90:87 (result), Spurs (subject), and Hornets (subject)" respectively.

Service category: Three organization structure keywords are successfully matched, and are "May 18 (time), San Antonio home (place), and NBA game (behavior)" respectively.

Knowledge category: Four organization structure keywords are successfully matched, and are "San Antonio (place), NBA game (related knowledge), Spurs (concept definition), and Hornets (concept definition)" respectively.

Because tags of two content keywords in information element organization structure words in the knowledge category in this example are both concept definitions of the knowledge category, a score 2 of a repetition rate of concept definitions of the knowledge category may be given to the information, so that automatic summarization quality is further improved according to the repetition rate of the information element organization structure words.

Step 2 of Embodiment 3: Determine the information category of the information according to a scoring result of each information category in step 1.

A plurality of information category scoring methods are available.

For example, if a quantity of successful matches between information element organization structure word tags in a piece of source information and news information element organization structure words in the information element lexicon is 3 (for example, time, place, and behavior), but weights of the news information element organization structure words "time, place, and behavior" are respectively preset to 5, 4, and 3, a news category score of the information may be determined as 3: A5\B4\C3.

Embodiment 4

Figure 7:
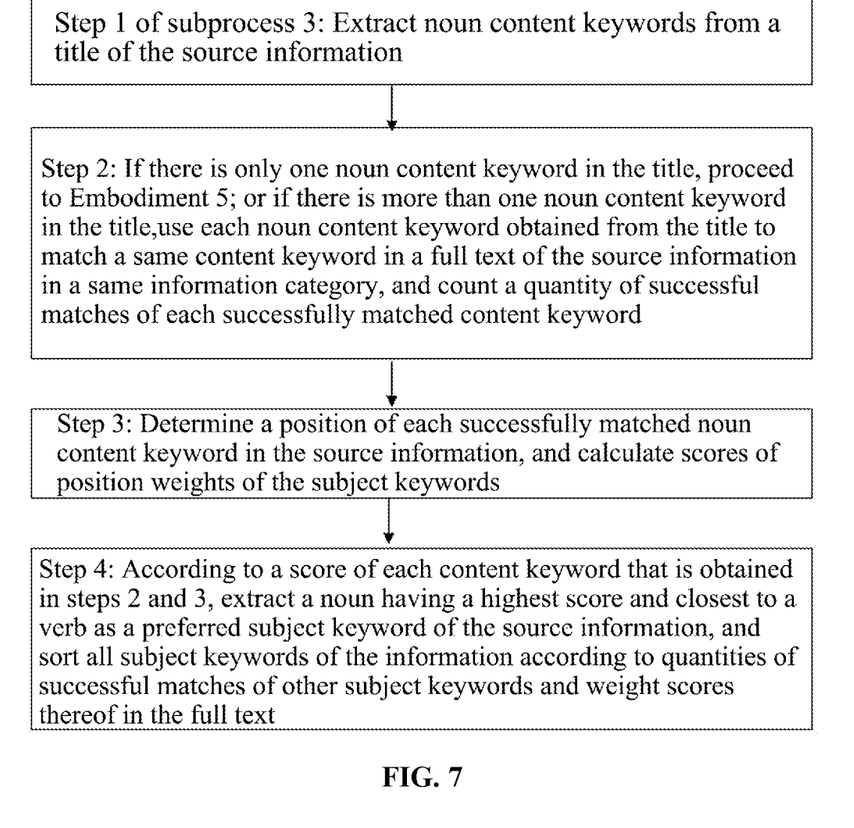
FIG. 7 is subprocess 3: a method for obtaining subject keywords of information.

Refer to FIG. 7.

The method for obtaining subject keywords of the information in step 4 of Embodiment 1 includes the following two methods:

One method is: first calculating quantities of repetitions of all noun keywords in the source information, then determining whether content keywords of high repetition rates appear in a title, and using content keywords that are of high repetition rates and appear in the title as subject keywords.

Steps of the other method for obtaining subject keywords of the information are as follows:

Step 1 of Embodiment 4: Extract noun content keywords from a title of the source information.

Step 2 of Embodiment 4: If there is only one noun content keyword in the title, proceed to Embodiment 5; or if there is more than one noun content keyword in the title, use each noun content keyword obtained from the title to match a same content keyword in a full text of the source information in a same information category, and count a quantity of successful matches of each successfully matched content keyword.

For example, when a title of a piece of news information is "A result of the NBA game at San Antonio home for the Spurs is 90:87, the Spurs beat the Hornets", all extracted noun content keywords include "Spurs, Hornets, San Antonio, NBA, and home"; in this case, quantities of successful matches of "Spurs, Hornets, San Antonio, NBA, and home" in a full text of the source information are counted separately.

Step 3 of Embodiment 4: Determine a position of each successfully matched noun content keyword in the source information, and calculate scores of position weights of the subject keywords.

The position weight is a distance between a noun content keyword and a verb and positions of the noun content keyword in the title and different paragraphs.

For example, in the noun content keywords "Spurs, Hornets, San Antonio, NBA, and home" in the foregoing example, "NBA" is closest to a verb "game" and is located before the verb; in this case, a distance weight of the subject keyword "NBA" may be scored.

Step 4 of Embodiment 4: According to a score of each content keyword that is obtained in steps 2 and 4, extract a noun having a highest score and closest to a verb as a preferred subject keyword of the source information, and sort all subject keywords of the information according to quantities of successful matches of other subject keywords and weight scores thereof in the full text.

For example, if different content keywords appear for a same quantity of times, but scores of position weights between the content keywords and verbs are different, all the content keywords may be used as subject keywords; however, sorting results of the subject keywords are different.

For example, "Spurs" is a content keyword that appears most frequently in the full text of the source information, but a content keyword that is closest to a verb and appears before the verb is "NBA", sorting results of the subject keywords "Spurs" and "NBA" are determined according to quantities of times that "Spurs" and "NBA" appear and a total score of position weights of the subject keywords.

Embodiment 5

Figure 8:
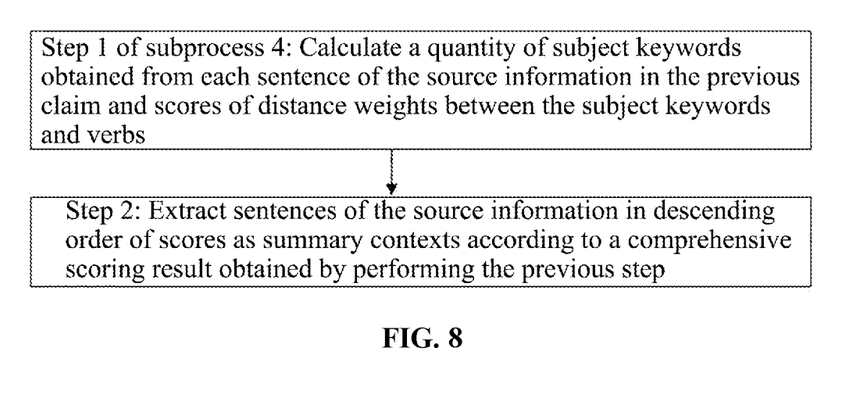
FIG. 8 is subprocess 4: a method for extracting content keywords and contexts of the information.

Refer to FIG. 8.

Properly and accurately determining the subject keywords is of great significance for extracting summary sentences from the source information. For example, the method for extracting content keywords and contexts of summary information in step 4 of Embodiment 1 may include the following steps:

Step 1 of Embodiment 5: Calculate a quantity of subject keywords obtained from each sentence of the source information in Embodiment 4 and scores of distance weights between the subject keywords and verbs.

For example, for a full text of source information "On May 18, the Spurs vs. Hornets game at San Antonio home is fierce, and captains of both parties have a good performance . . . . In the last 10 seconds of overtime, captain Hayward of the Spurs scores three points, and a final result is 90:87, the Spurs beat the Hornets . . . ", a quantity of hit subject keywords in each sentence is calculated.

For another example, for a definition of "distance between a subject keyword and a verb", refer to Embodiment 4.

Step 2 of Embodiment 5: Extract sentences of the source information in descending order of scores as summary contexts according to a comprehensive scoring result obtained by performing the previous step.

For example, in the foregoing example, if sorting results of comprehensive scores of "the Spurs vs. Hornets game at San Antonio home is fierce" and "the Spurs beat the Hornets" are the first and the second, the two sentences are preferentially extracted and used as contexts of summary information.

Obviously, using the foregoing method to extract the summary information of the web page or text information can greatly improve summary extraction quality of the web page and text information. However, in the source information, probably there is more than one source information sentence in which a subject keyword matching rate is the same and a subject keyword is closest to a verb and appears before the verb.

For example, in the three sentences "the Hornets vs. Spurs game is fierce", "the Hornets hit an underbelly of the Spurs", and "the Spurs beat the Hornets", quantities of matches of the subject keywords "Spurs" and "Hornets" are the same, and "Spurs" is closest to a verb and appears before the verb, but the first two sentences are not suitable objects for summary extraction in the source information.

Therefore, using the foregoing method to determine a sentence for summary extraction cannot definitely ensure quality of summary extraction.

However, information elements included in a title of web page information are actually quite rich. For example, it is also absolutely possible that "A result of the game at San Antonio home is 90:87, the Spurs beat the Hornets" is a title of a piece of sports news information. This title already includes news element information "place, behavior, and result", but lacks a "time" element. As a result, summary information of the news title has critical defects. For example, it is absolutely possible that this information was published last year or the year before last year.

A characteristic of title information is that the title information is definitely related to a subject of the source information. According to the characteristic of the title information, the present invention further provides a method for supplementing title information elements, to solve the problem encountered in the foregoing embodiment and further improve summary quality of the web page and text information.

Embodiment 6

Figure 9:
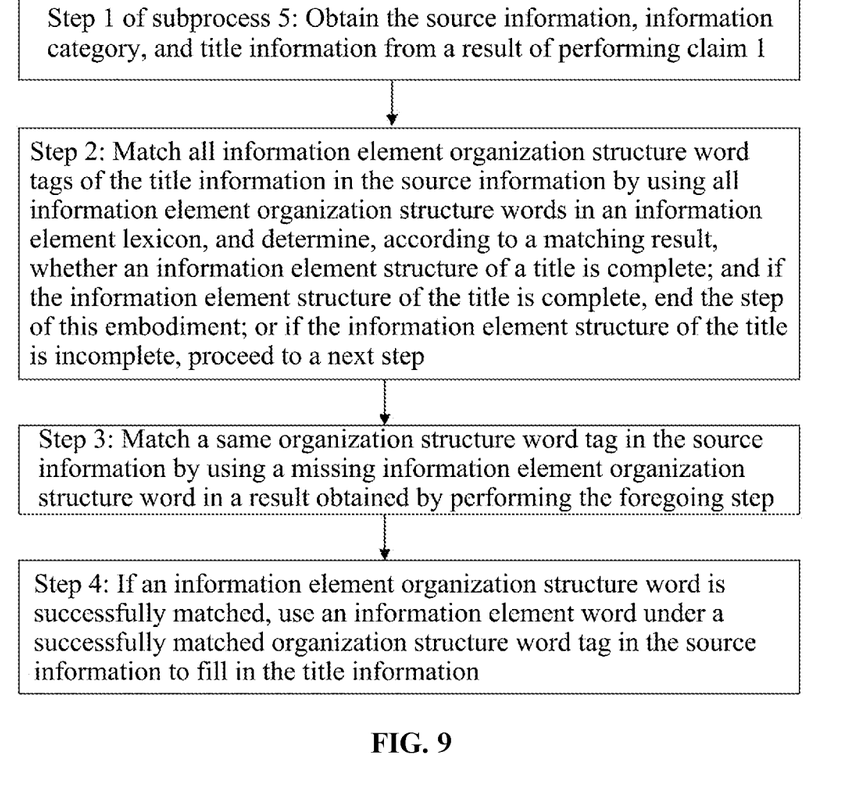
FIG. 9 is subprocess 5: a method for supplementing information elements.

Refer to FIG. 9.

The method for supplementing title information elements in Embodiment 1 includes the following steps:

Step 1 of Embodiment 6: Obtain the source information, information category, and title information from a result of performing Embodiment 1.

For example, the information category obtained in the foregoing example is "news", and the obtained title is "A result of the game at San Antonio home for the Spurs is 90:87, the Spurs beat the Hornets".

Step 2 of Embodiment 6: Match all information element organization structure word tags of the title information in the source information by using all information element organization structure words in an information element lexicon, and determine, according to a matching result, whether an information element structure of a title is complete; and if the information element structure of the title is complete, end the step of this embodiment; or if the information element structure of the title is incomplete, proceed to a next step.

For example, a matching result between the title "A result of the game at San Antonio home for the Spurs is 90:87, the Spurs beat the Hornets" and the news information element organization structure words lacks the "time" element information. In this case, step 3 is performed.

Step 3 of Embodiment 6: Match a same organization structure word tag in the source information by using a missing information element organization structure word in a result obtained by performing the foregoing step.

For example, if the result obtained by performing step 2 is that the title information in the news category lacks the "time" information element, the full text of the source information is searched for whether there is an information element organization structure word tag "news—time".

Step 4 of Embodiment 6: If an information element organization structure word is successfully matched, use an information element word under a successfully matched organization structure word tag in the source information to fill in the title information.

For example, if an information element organization structure word "time" in the information element lexicon matches an information element organization structure word tag "time" in the source information, an information element word (for example, May 18) under the organization structure word tag "time" in the source information is used and added to the news title "A result of the game at San Antonio home for the Spurs is 90:87, the Spurs beat the Hornets", so that summary content of the information is more complete.

From the foregoing example, it can be seen that advantages of a title summarization method are as follows: If information elements of the title information are complete, using the title as a main object for summary extraction can properly solve a disadvantage of determining a sentence for summary extraction according to a matching rate of the subject keywords and distances from verbs, and can more accurately and easily extract the summary information of the web page or text information.

Certainly, the method for supplementing summary information elements according to Embodiment 6 may also be used as a means for supplementing information elements of summary content that has been generated.

For example, if there is no "time" information in the full text of the source information, a range for searching for the "time" information may be further expanded. For example, time information is extracted from a publishing time record of the web page information.

The method in this embodiment is also applicable to supplementation of information elements of a sentence in the text of the source information.

However, in the method for summary extraction by supplementing title information elements, a difficult problem may also be encountered, that is, a title information structure is complex or severely defective. For example, many information headlines on the Internet use dual-structure titles or multi-structure titles. For example, a news headline "A result of the NBA game at San Antonio home on May 18 is 90:87, the Spurs beat the Hornets" is a dual-structure title; "Renrenche is in a dangerous situation: Layoffs continue to ferment and co-founder Wang Qingxiang resigns" is a three-structure title, and information elements of each headline structure are incomplete structures.

To solve this problem, the present invention further provides a method for superposing title information element organization structure words, to provide a summary of web page and text information more efficiently.

Embodiment 7

Figure 10:
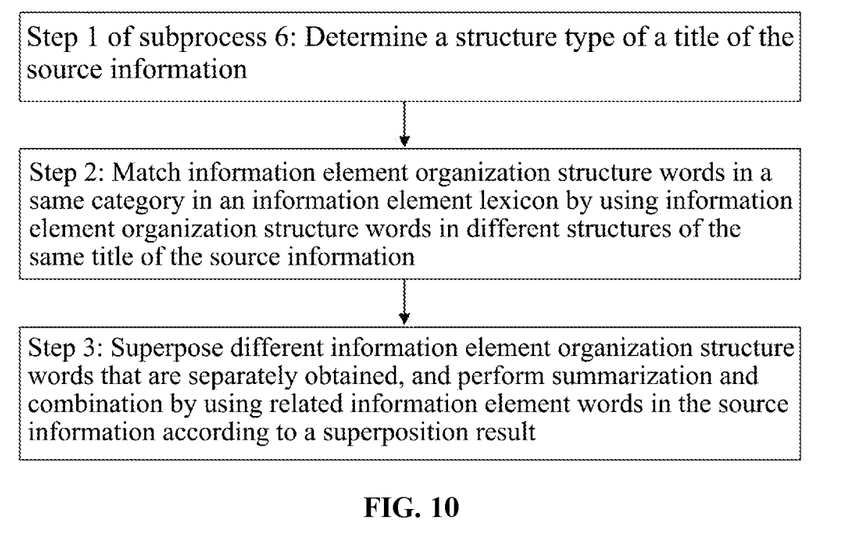
FIG. 10 is subprocess 6: a method for superposing title information element organization structure words.

Refer to FIG. 10.

Step 1 of Embodiment 7: Determine a structure type of a title of the source information.

For example, determine that "A result of the NBA game at San Antonio home on May 18 is 90:87, the Spurs beat the Hornets" has two structures.

Step 2 of Embodiment 7: Match information element organization structure words in a same category in an information element lexicon by using information element organization structure words in different structures of the same title of the source information.

For example, divide the title information "A result of the NBA game at San Antonio home on May 18 is 90:87, the Spurs beat the Hornets" into two parts, and use "A result of the NBA game at San Antonio home is 90:87" and "the Spurs beat the Hornets" to respectively match information element organization structure words in a same category (news category).

Step 3 of Embodiment 7: Superpose different information element organization structure words that are separately obtained, and perform summarization and combination by using related information element words in the source information according to a superposition result.

The information element organization structure word superposition is to combine matching results of different parts of information element organization structure words in the same information category and the same title.

For example, information element organization structure words successfully matching "A result of the NBA game at San Antonio home on May 18 is 90:87" in the first segment of the title of the news source information include "time, place, behavior, and result", but information element organization structure words successfully matching "the Spurs beat the Hornets" in the second segment include "subject"; in this case, information element organization structure words in the two structures may be superposed, and then summary information is extracted.

For example, summary information combined in the foregoing example is "A result of the NBA game at San Antonio home on May 18 is 90:87, the Spurs beat the Hornets", so that the summary information elements are more complete.

Likewise, this method not only can be used to improve matching quality of the information elements of the title information, but also can be used to improve summary quality of sentences of the text.

For example, it is also absolutely possible that "A result of the NBA game at San Antonio home on May 18 is 90:87, the Spurs beat the Hornets" is a sentence in a news report. As summary quality of sentences is improved, summary quality of full-text information is also improved naturally.

However, in the foregoing title "Renrenche is in a dangerous situation: Layoffs continue to ferment and co-founder Wang Qingxiang resigns", "Renrenche is in a dangerous situation" includes only a subject, "Layoffs continue to ferment" includes only a subject and behavior, and "co-founder Wang Qingxiang resigns" also includes only a subject and behavior; a method for matching the title by segment by using information element organization structure words and then mutually supplementing related information elements obviously has no actual significance.

For this type of title information, only the methods in Embodiments 4 and 5 can be used to extract summary information or sentences, and quality is also high.

The method for superposing information element organization structure words in Embodiment 7 is also applicable to information element processing in units of sentences in the text of the source information.

Embodiment 8

Figure 11:
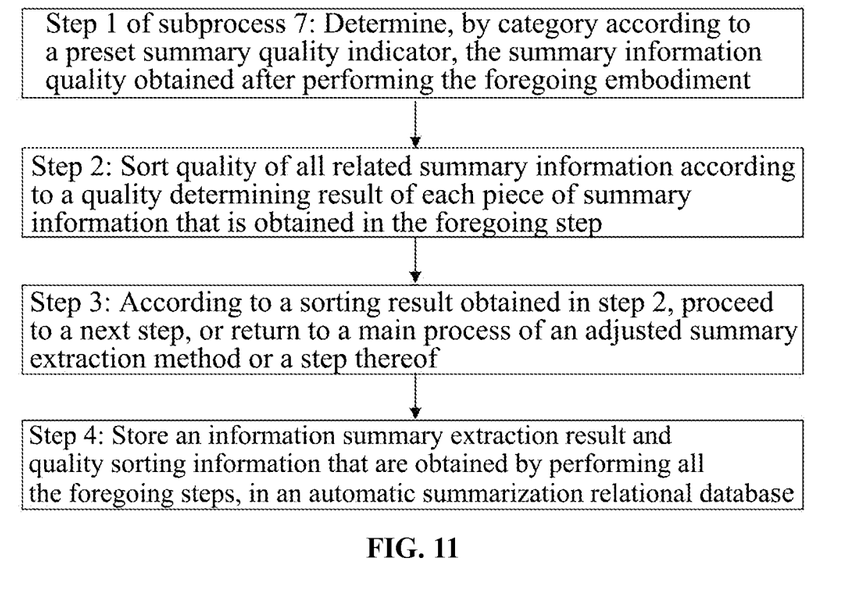
FIG. 11 is subprocess 7: a method for determining summary information quality.

Refer to FIG. 11.

The method for determining summary information quality by using a summary quality indicator, and scoring the summary information quality according to a quality determining result in step 5 of Embodiment 1 includes the following steps:

Step 1 of Embodiment 8: Determine, by category according to a preset summary quality indicator, the summary information quality obtained after performing the foregoing embodiment.

The summary quality indicator may include availability, integrity, and reliability. The availability indicates whether summary information in the present invention lacks a core element.

For example, for a summary of news information, "subject" and "behavior" may be core elements, but for a summary of product information, "product name" and "manufacturer" may be core elements.

The integrity indicates whether there is an information element word under each information element structure word of the summary information.

For example, if an information element structure of news information includes only "time, place, subject, behavior, and result", and there is an information element word under each organization structure word, fully five points may be scored for integrity of summary information of the news; however, if there is no information element word under an information element organization structure word, 1 is subtracted from the score.

The reliability indicates a direct correlation between an information publisher and published information.

For example, if a source of related information is a directly related organization, enterprise, or individual, reliability of the information source is a highest level 1; if a source is a professional news organization, reliability is a second highest level 2; or if a source is any other information source (for example, self-media), reliability is a level 3.

Step 2 of Embodiment 8: Sort quality of all related summary information according to a quality determining result of each piece of summary information that is obtained in the foregoing step.

The sorting of quality of all related summary information includes two cases: sorting quality of related summary information in a same category (for example, summaries of news information), and sorting related summary information in different categories (summaries of news and knowledge). The summary quality determining results in this step include quality determining results in the foregoing two cases.

For example, summary quality of news information related to the Hornets vs. Spurs game may be different. For example, quantities of matched core information elements are different, or integrity of information elements is different.

For another example, summary extraction is performed on a same piece of summary information (for example, "A result of the NBA game at San Antonio home on May 18 is 90:87" by using information element organization structure words in different categories (for example, news, notice, knowledge, and product). Because organization structure word tags are different, summary content in different information categories is also obviously different.

In the present invention, not only summary quality of different information in a same category is determined and sorted, but also summary quality of same information in different categories is sorted.

Step 3 of Embodiment 8: According to a sorting result obtained in step 2, proceed to a next step, or return to a main process of an adjusted summary extraction method or a step thereof.

The adjusted summary extraction method includes adjusting an information element lexicon and adjusting a weight indicator of an information element organization structure word, and the information element lexicon adjustment is to increase or decrease information element words or information element word categories in the information element lexicon.

For example, in news information element organization structure word tagging results of "A result of the NBA game at San Antonio home on May 18 is 90:87, the Spurs beat the Hornets" in the foregoing example, if a content keyword "game" is not included as an information element word under a news information element organization structure word "behavior", a news summary extraction result lacks an information element word "game" under the word "behavior".

However, according to a preset rule that all nouns in content keywords without information element attribute tags may be used as information element words under a news information element organization structure word "subject", two "news—subject" element words appear in tagging results thereof: "May 18 (news—time), San Antonio home (news—place), NBA (news—subject), game (news—subject), 90:87 (news—result), Spurs (news—subject), Hornets (news—subject) . . . .

Under the four "subject" words, only "game" has dual noun and verb attributes. In this case, according to the dual noun and verb attributes of the word "game", the word "game" is added as an information element word under a news information element organization structure word "behavior" in the information element lexicon.

For another example, if weight scores of original news information element organization structure words "time, place, subject, behavior, and result" are respectively 5, 4, 3, 2, and 1, a weight score obtained in an example of source information "On May 18 (time), the NBA (subject) game (behavior) at San Antonio home (place) is ended" is 14; however, a weight score obtained in source information "A result (result) of the NBA (subject) game (behavior) at San Antonio home (place) is 90:87" having more news value is 10.

It should be stressed that the preset weight values are not unreasonable because in a lot of news information, result information does not appear at all. For example, a "result" information element word is not required and does not appear in news information "At the official opening of the 24$^{th}$ Olympic Games in Sapporo, Japan . . . "

Therefore, a solution to information element weighting in the foregoing problem may be: when determining that a piece of information is competition or game information (for example, content keywords such as "game and result" appear; for example, various terms of competitions or games in military, sports, knowledge, and technical categories appear simultaneously), increasing a weight score of a news information element organization structure word "result".

Steps of the adjusted summary extraction method may be completed automatically, or may be completed with human participation.

Step 4 of Embodiment 8: Store an information summary extraction result and quality sorting information that are obtained by performing all the foregoing steps, in an automatic summarization relational database.

It should be specially noted that various methods in the automatic summarization method provided by the present invention may be subject to change of an application sequence by a user and freely combined. All independent claims of each related method in the present invention are objects requested to be protected in the present invention patent.

Based on a double-ten law of an Internet information organization structure, the present invention provides an automatic summarization method, where matching information element organization structure words by category is added to an existing subject keyword matching method, and content keywords and related contexts of summary information are directly extracted by using various successfully matched information element organization structure words. On this basis, the present invention further provides a method for supplementing summary information elements based on title information, and a method for superposing title information element organization structure words. Therefore, a new method for automatically summarizing web page and text information is comprehensively and systematically provided, and automatic summarization quality of the web page and text information can be greatly improved.

In view of a fundamental improvement of automatic summarization quality of general web page and text information, which has irreplaceable core value for an Internet information organization structure and information applications, the implementation and application of the present invention will not only have a great impact on various fields of Internet information applications, but also powerfully promote further development of Internet applications.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media, including but not limited to a magnetic disk storage, an optical storage, and the like that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or any other programmable data processing device, so that a series of operations and steps are performed on the computer or any other programmable device, thereby generating computer-implemented processing. Therefore, the instructions executed on the computer or any other programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the protection scope defined by the following claims and equivalent technologies thereof.

What is claimed is:

1. A method for automatically summarizing Internet web page and text information, implemented by a computer, the method comprising:
S1, obtaining, by the computer, a preset web page information and text information element top-level high-frequency organization structure word list, and web page or text source information for which information element top-level high-frequency organization structure word tags have been obtained and which is available for summary extraction;
S2, determining, by the computer, whether an information category of the source information categorized based on information element top-level high-frequency organization structure words has been obtained; and if the information category has been obtained, proceeding to S3; or if the information category has not been obtained, automatically categorizing the source information to obtain the information category of the source information;
S3, determining, by the computer, whether subject keywords of the web page or text information have been indicated in the source information; and if the subject keywords of the web page or text information have been indicated in the source information, proceeding to S4; or if the subject keywords of the web page or text information have not been indicated in the source information, obtaining the subject keywords of the source information;
S4, extracting content keywords and contexts of summary information by using the obtained information category of the source information, organization structure words from the word list for the information category of the source information, and the subject keywords, and forming summary information of the source information with extracted content keywords and contexts,
wherein the forming summary information of the source information with extracted content keywords and contexts comprises:
determining a list of organization structure words corresponding to the information category of the source information;
determining a title of the source information;
comparing content keywords in the title of the source information with the organization structure words in the list to determine a first organization structure word in the list that is not matched with any content keywords in the title;

extracting, from the source information other than the title, a first content keyword matching with the first organization structure word; and obtaining the summary information of the source information by filling the first content keyword into the title;

S5, determining, by the computer, summary information quality by using a summary quality indicator, and scoring the summary information quality according to a quality determining result;

S6, storing, by the computer, summary information obtained after performing S1-S5, in an automatic summarization result storage database;

wherein a difference between the web page information and the text information lies in that the web page information comprises some application attribute tags of the web page information, but the text information lacks application attribute tags;

the preset information element top-level high-frequency organization structure word list is a categorization set of top-level high-frequency organization structure words that indicate functions and an effective range of content keywords of the web page and text information and cannot be further summarized;

the content keywords are keywords in the source information that represent file content;

the source information for which top-level high-frequency organization structure word tags have been obtained is a set of all content keywords of the web page or text information for which information element top-level high-frequency organization structure word tags have been obtained;

the source information available for summary extraction is original information that has undergone processing including automatic word segmentation, filtering of prepositions and function words, and part-of-speech tagging, wherein the part-of-speech is a application attribute comprising a noun, a verb, an adjective, or a preposition; and the subject keywords are keywords that represent a content subject of the web page or text information.

2. The method for automatically summarizing Internet web page and text information of claim 1, wherein obtaining information element top-level high-frequency organization structure word tags comprises the following steps:

S15, storing all content keywords having information element attributes in various types of web page or text information, in a preset information element lexicon by category;

S16, performing all-element traversal matching in different categories for all content keywords of the source information by using all information element words in the information element lexicon; and S17, for any content keyword of the source information that successfully matches an information element word in the information element lexicon, adding an information element organization structure word tag in each information category;

wherein the content keywords having information element attributes have application attributes for being used as information element words in the information category;

the information element lexicon is a database for storing all information element words by category; and the all-element traversal matching means for any piece of source information, using all information element words in the information element lexicon to match all content keywords of the source information.

3. The method for automatically summarizing Internet web page and text information of claim 1, wherein the information category is obtained by:

S18, performing all-element traversal matching for all information organization structure word tags in the content keywords of the source information by using all information element organization structure words in all categories in the information element organization structure word list, and calculating a quantity of successful matches of information element organization structure words in each category; and S19, determining the information category of the information according to a scoring result of each information category.

4. The method for automatically summarizing Internet web page and text information of claim 1, wherein subject keywords are indicated by:

S20, extracting noun content keywords from the title of the source information;

S21, counting a quantity of appearance of each noun content keyword, which are obtained from the title, in the source information;

S22, determining a position of each appearance of each noun content keyword in the source information, and calculating scores of position weights of the content keywords; and S23, according to a score of each content keyword that is obtained in S22, extracting a noun having a highest score and closest to a verb as a preferred subject keyword of the source information;

wherein the position weight is a distance weight between a noun content keyword and a verb.

5. The method for automatically summarizing web page and text information of claim 1, wherein determining summary information quality by using a summary quality indicator, and scoring the summary information quality according to a quality determining result comprises the following steps:

S26, extracting the content keywords and contexts of the summary information;

S27, determining, by category according to a preset summary quality indicator, the summary information quality;

S28, sorting quality of all related summary information according to a summary information quality determining result obtained in S27; and S29, storing an information summary extraction result and quality sorting information that are obtained by performing S26-S28, in an automatic summarization storage database;

wherein the summary quality indicator comprises availability, integrity, and reliability;

the availability indicates whether a summary information structure in the present invention lacks a core element;

the integrity indicates whether there is an information element word associated with each information element structure word of the summary information;

the reliability indicates a direct correlation between an information publisher and published information.

* * * * *

UNITED STATES PATENT AND TRADEMARK OFFICE
CERTIFICATE OF CORRECTION

| | | |
|---|---|---|
| PATENT NO. | : 11,514,242 B2 | Page 1 of 1 |
| APPLICATION NO. | : 16/984095 | |
| DATED | : November 29, 2022 | |
| INVENTOR(S) | : Liu et al. | |

It is certified that error appears in the above-identified patent and that said Letters Patent is hereby corrected as shown below:

On the Title Page

Add item (30)
FOREIGN APPLICATIONS
CHINA CN201910737556.1 08/10/2019

Signed and Sealed this
Fifteenth Day of October, 2024

Katherine Kelly Vidal
*Director of the United States Patent and Trademark Office*